UNITED STATES PATENT OFFICE

2,159,804

N-NITROARYL POLYHYDROXY ALKYL AMINO COMPOUNDS AND PROCESS OF PREPARING THE SAME

Walter Eastby Lawson and Charles Philip Spaeth, Woodbury, N. J., assignors to E. I. du Pont de Nemours & Company, Wilmington, Del., a corporation of Delaware No Drawing. Application November 23, 1937, Serial No. 176,004

13 Claims.  (Cl. 260—210)

This invention relates to new and useful chemical compounds and methods for their preparation, and more particularly to new compounds resulting from condensation reactions.

Recent activities in the field of organic chemistry have made available a number of new compounds which offer attractive possibilities for advances in organic synthesis. Glucamine and its derivatives, for example, are thus readily available.

An object of the present invention is a method for preparing new chemical compounds by a condensation reaction of polyhydroxy aliphatic amino compounds and their alkyl derivatives with certain other compounds containing groups or radicals contributing to the desired properties. Another object is a method for the preparation of new chemical compounds from glucamine and its alkyl derivatives. A further object comprises a method of preparing such compounds whereby the functional groups present in the glucamine nucleus become advantageously utilizable for further reactions. Additional objects will be disclosed as the invention is described more fully hereinafter.

We have found that desirable new chemical compounds are obtained when a polyhydroxy alkyl amino compound containing more than 4 and less than 7 carbon atoms or one of its N-alkyl derivatives is caused to react with a halogenated-nitro-compound, of an aromatic hydrocarbon, particularly a chlorinated compound, in the presence of a basic condensation agent. As the polyhydroxy alkyl amino compound for this reaction, we prefer to employ glucamine, xylamine, galactamine, fructamine or the like, as well as alkyl derivatives of the same.

The new compounds resulting from the process of our invention are believed to be N-nitroaryl polyhydroxy alkyl amino compounds represented by the following formula:

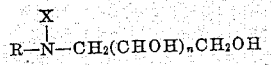

In this formula, R represents a nitroaryl group, namely, an aryl group containing one or more nitro groups, at least one of said nitro groups being in the ortho or para position with respect to the amino group to which said nitroaryl group is joined. X represents an alkyl group or hydrogen, and $n$ represents a numeral greater than 2 and less than 5.

While many different compounds may be used as starting materials, resulting in varied products, the following examples will serve to illustrate our invention.

Example 1

A mixture of 0.1 mol each of 4-chloro-1,3-dinitro-benzene, and methyl glucamine, together with 0.1 mol of anhydrous sodium carbonate, was heated in 75 cc. acetone under a reflux condenser for 4 hours. The solution was filtered while hot to remove inorganic material. The filtrate was evaporated on the steam bath with stirring. The orange-red oil set to form a bright yellow solid, crystallization being induced by digestion of the oil with almost one-half its volume of chloroform. A yield of 36 grams was obtained. After two recrystallizations from methanol, the new compound had a melting point of 126-129° C. (dec.), and the crystals were fine, transparent yellow plates of irregular shape. The compound was found by analysis to have a nitrogen content of 11.42%, as compared with a calculated 11.62% for the pure material, and was believed to be 2,4-dinitrophenyl-methyl-glucamine.

Example 2

Similar proportions of dinitrochlorobenzene and glucamine were refluxed in the presence of a like amount of sodium carbonate in methyl alcohol. The product was a viscous, dark red oil, believed to be 2,4-dinitrophenyl-glucamine.

Example 3

Molecular proportions of methyl glucamine (4.4 grams), potassium hydroxide (1.46 grams in ethyl alcohol), and picryl chloride were allowed to stand in about 50 cc. of ethyl alcohol. An oily precipitate was formed slowly. The solution was filtered and evaporated to small volume on the steam bath. The brown solid, after separation, was filtered, washed with alcohol, and dried. A weight yield of 7.8 grams was obtained, the product having a melting point of 165-175° C.

Example 4

A mixture of 0.02 mol each of glucamine, picryl chloride and fused sodium acetate was refluxed in ethyl alcohol for 1½ hours. The solution was filtered and the filtrate evaporated. The residual oil was separated from the yellow crystals by washing with ethyl alcohol. A yield of 3.3 grams was obtained.

Example 5

One gram molecule of 4-chloro-1-nitrobenzene and 1 gram molecule of methyl glucamine were dissolved in 700 cc. pyridine and heated for 4 hours at 125-130° C. The solution was then evaporated to dryness and enough water added to give a volume of 2 to 3 liters. The solution was boiled, filtered through charcoal, and cooled to 10° C. The product separated as a light yellow solid melting at 162-163° C. A yield of 100 g. was obtained.

In the foregoing examples, the use of 4-chloro-1,3-dinitrobenzene, 2-chloro-1-3-5-trinitrobenzene and 4-chloro-1-nitrobenzene has been cited. Our invention contemplates, however, the employment as the chloro-nitro-compound of a great variety of such derivatives of aromatic hydrocarbons. For example, we may employ 2-chloro-1-nitrobenzene, 4-chloro-1-nitrobenzene, 4-chloro-1-3-dinitrobenzene, 2-4-dichloro-1-3-5-trinitrobenzene, 4-6-dichloro-1-3-dinitrobenzene, 2-4-dichloro-1-3-dinitrobenzene, 2-4-6-trichloro-1-3-dinitrobenzene, 2-chloro-3-5-dinitro-1-methyl benzene, 4-chloro-1-3-dinitronaphthalene, 4-chloro-1-5-dinitro-naphthalene, and other chloronitro-derivatives. It is necessary that the nitro group or groups be in either the ortho or the para position with respect to the chlorine atom. In the case of the polycyclic aromatic hydrocarbon derivatives, however, it is essential that at least one chlorine atom and at least one nitro group be attached to the same benzene ring. While we have referred particularly to the chlorine-containing aromatic nitro-compounds in the foregoing, it will be understood that other halogenated compounds may be used also, namely, the corresponding bromo- and iodo-derivatives.

As amino-compounds we prefer to employ glucamine, methyl glucamine, ethyl glucamine, or other N-alkyl glucamine derivative. As basic condensation agents, we prefer to employ sodium carbonate, sodium bicarbonate, sodium acetate, potassium hydroxide, pyridine, and the like.

The condensation compounds prepared in accordance with our invention have many useful and attractive applications. For example, these compounds are highly desirable for use as dyestuff intermediates.

It is to be understood that the phrase "a glucamine" as used in the claims hereafter includes both glucamine itself and the N-alkyl derivatives thereof, some of which have been disclosed in the foregoing.

We have described our invention in detail in the foregoing, but the examples and detailed directions are to be taken as illustrative only. We wish to be limited only by the following patent claims.

We claim:

1. The method of preparing new chemical compounds which comprises reacting, in the presence of a basic condensation agent, a halogenated aromatic hydrocarbon nitrated in at least one position taken from the group consisting of those ortho and para to the halogen group, said halogen group and at least one nitro group being attached to the same benzene ring, with a compound selected from the group consisting of the polyhydroxy alkyl amines containing more than four and less than seven carbon atoms and N-alkyl derivatives of the same.

2. The method of preparing new chemical compounds which comprises reacting with a glucamine, in the presence of a basic condensation agent, a halogenated aromatic hydrocarbon nitrated in at least one position taken from the group consisting of those ortho and para to the halogen group, and in which said halogen group and at least one nitro group are attached to the same benzene ring.

3. The method of claim 2 wherein the glucamine employed comprises methyl glucamine.

4. The method of claim 2 wherein the glucamine employed comprises ethyl glucamine.

5. The method of preparing new chemical compounds which comprises reacting with a glucamine, in the presence of a basic condensation agent, a chlorinated aromatic hydrocarbon nitrated in at least one position taken from the group consisting of those ortho and para to the chlorine group, said chlorine group and at least one nitro group being attached to the same benzene ring.

6. The method of preparing N-nitroaryl glucamines which comprises reacting a chloro-nitro benzene in which the nitro groups are in at least one position taken from the group consisting of those ortho and para to the chlorine group, with a glucamine in the presence of a basic condensation agent.

7. The method of preparing 2,4-dinitrophenyl-methyl glucamine which comprises reacting 4-chloro-1,3-dinitrobenzene with methyl glucamine in the presence of a basic condensation agent.

8. As new chemical compounds the products resulting from the reaction, in the presence of a basic condensation agent, of a halogenated aromatic hydrocarbon nitrated in at least one position taken from the group consisting of those ortho and para to the halogen group wherein said halogen group and at least one nitro group are attached to the same benzene ring, with a compound taken from the group consisting of the polyhydroxy alkyl amines containing more than four and less than seven carbon atoms and N-alkyl derivatives of the same.

9. As new chemical compounds the products resulting from the reaction with a glucamine, in the presence of a basic condensation agent, of a halogenated aromatic hydrocarbon nitrated in at least one position taken from the group consisting of those ortho and para to the halogen group wherein the halogen group and at least one nitro group are attached to the same benzene ring.

10. As new chemical componds, the products resulting from the reaction of a chloro-nitro benzene in which at least one nitro group is in a position taken from the group consisting of those ortho and para to the halogen group to the chlorine group, with a glucamine in the presence of a basic condensation agent.

11. As a new chemical compound 2,4-dinitrophenyl-methyl glucamine.

12. The new chemical compounds represented by the formula:

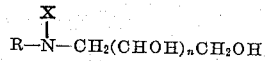

wherein R represents a nitroaryl group in which at least one nitro group is in a position taken from the group consisting of those ortho and para to the position at which the amino group is joined to said nitroaryl group and at least one nitro group is in the same benzene ring to which said aliphatic amino group is joined, X is selected from the group consisting of alkyl radicals and hydrogen, and $n$ represents a numeral greater than two and less than five.

13. The method of preparing new chemical compounds which comprises reacting with glucamine, in the presence of a basic condensation agent, a halogenated aromatic hydrocarbon nitrated in at least one position taken from the group consisting of those ortho and para to the halogen group, and in which said halogen group and at least one nitro group are attached to the same benzene ring.

WALTER EASTBY LAWSON.
CHARLES P. SPAETH.